United States Patent [19]

Pokhodnya et al.

[11] 3,735,090

[45] May 22, 1973

[54] FLUX CORED TUBULAR ELECTRODE FOR GAS SHIELDED ELECTRIC-ARC WELDING

[75] Inventors: Igor Konstantinovich Pokhodnya; Vladimir Nikolaevich Golovko, both of Kiev, U.S.S.R.

[73] Assignee: Institut Elektrosvarki imeni E. O. Patrona Akademii Nauk Ukrainskoi SSR, Kiev, U.S.S.R.

[22] Filed: July 8, 1971

[21] Appl. No.: 160,918

[52] U.S. Cl..................................219/146, 219/137
[51] Int. Cl. ...............................................B23k 35/22
[58] Field of Search........................219/145, 146, 73, 219/137; 117/202–207; 148/24, 26

[56] References Cited

UNITED STATES PATENTS

| | | | |
|---|---|---|---|
| 3,596,054 | 7/1971 | Pokhodnya | 219/146 |
| 3,539,765 | 11/1970 | Duttera et al. | 219/146 |
| 3,177,340 | 4/1965 | Danhier | 219/146 |

*Primary Examiner*—J. V. Truhe
*Assistant Examiner*—George A. Montanye
*Attorney*—Eric H. Waters, John G. Schwartz and J. Harold Nissen

[57] ABSTRACT

A continuous electrode for shielded-gas welding and building-up of steels consisting of a powdery core in a steel envelope, the core comprising taken in the following per cent by weight:

| | |
|---|---|
| fluorite concentrate | TG 15–26 |
| marble | 5.0–10 |
| ferromanganese | 4.5–6.5 |
| ferrosilicon | 1.0–3.5 |
| alumina | 2.0–6.0 |
| manganese ore | 0.5–1.5 | the balance being iron powder.

The electrode having a core composition according to the present invention features good welding and technological characteristics and provides for high mechanical properties of the weld joint metal.

2 Claims, No Drawings

FLUX CORED TUBULAR ELECTRODE FOR GAS SHIELDED ELECTRIC-ARC WELDING

The present invention relates to electrode materials for electric-arc welding and, more particularly, the invention relates to continuous electrodes for welding with forced and free formation of a weld joint in a shielding gas atmosphere, preferably in carbon dioxide gas.

This invention can most effectively be used in automatic and semi-automatic welding with a forced and free formation of a weld joint in a shielding gas atmosphere.

Known in the art are continuous electrodes for shielded-gas welding. The best characteristics are exhibited by electrodes whose core contains fluorite concentrate, marble, ferromanganese, ferrosilicon iron powder.

For example, a flux-cored welding electrode is known the core of which contains 5–25 percent of fluorite concentrate, 1.5–10 percent of marble, 5–10 percent of ferromanganese, 2–8 percent of ferrosilicon, 60 percent of iron powder (cf. British Pat. No. 1,079,710, cl.B3k).

However, these known flux-cored electrodes have poor welding and technological characteristics and inadequate mechanical properties of the metal of the weld joint.

The specific object of the invention is to provide such a continuous electrode for shielded-gas welding, in which the composition of the core would ensure good welding and technological characteristics and mechanical properties of the weld joint metal within a wide range of operating conditions as well as high efficiency of building-up.

This object is attained by providing a continuous electrode for a shielded-gas welding process which consists of a powdery core in a steel sheath containing fluorite concentrate, marble, ferromanganese, ferrosilicon, iron powder, wherein, according to the invention, the powder core, besides the above-mentioned components taken in per cent by weight:

| fluorite concentrate | 5–26 |
| marble | 5–10 |
| ferromanganese | 4.5–6.5 |
| ferrosilicon | 1 – 3.5 | also contains:

| alumina | 2–6 |
| manganese ore | 0.5–1.5, | the balance being iron powder.

The electrode having a core composition according to the present invention features good welding and technological characteristics and provides for high mechanical properties of the weld joint metal.

The present invention will be apparent from the following examples of carrying out the invention.

The continuous electrode for shielded-gas welding of steels with forced and free formation of a weld joint according to the invention consists of a powder core in a steel sheath comprising the following components taken in percent by weight of the core:

| fluorite concentrate | 15–26 |
| marble | 5–10 |
| ferromanganese | 4.5–6.5 |
| ferrosilicon | 1–3.5 |
| alumina | 2–6 |
| manganese ore | 0.5–1.5 | the balance being iron powder.

The selected ratio of the components makes it possible to produce slag having good physical and technological properties.

The advantages of the proposed electrode as compared with the known electrodes are illustrated in the following examples.

EXAMPLE 1

A continuous flux-cored electrode having a diameter of 2.5 mm, in which the steel sheath comprises 70 percent of the electrode by weight and the core has the following composition (wt.%):

| fluorite concentrate | 15 |
| marble | 5 |
| ferromanganese | 4.5 |
| ferrosilicon | 1.0 |
| alumina | 2.0 |
| manganese ore | 0.5 |
| iron powder | 72.0 |

This electrode provides for good formation of the weld joint metal and allows the slag to be easily removed. The process of welding is characterized by good stability, and the losses of splashed metal are insignificant as seen from the data given below.

| Type of welding | Position of welding | Welding current, a. | Welding voltage, v. | Instantaneous strength, kg./mm.$^2$ | Specific elongation, percent | Impact strength in kg.m/cm.$^2$ at— | | |
|---|---|---|---|---|---|---|---|---|
| | | | | | | +20° C. | −40° C. | −60° C. |
| Free formation | Downhand | 350–400 | 28–32 | 50.3–51.5 | 29.2–31.2 | 20.2–23.4 | | 10.2–12.4 |
| Forced formation | Vertical | 350–400 | 28–30 | 52.5–53.5 | 29.4–32.5 | 15.5–17.2 | 8.5–10.5 | |

EXAMPLE 2

A continuous flux-cored electrode having a diameter of 3.0 mm, in which the steel sheath comprises 70 percent of the total weight of the electrode, the core containing (percent by weight):

| fluorite concentrate | 20 |
| marble | 7 |
| ferromanganese | 6 |
| ferrosilicon | 3.5 |
| alumina | 3.5 |
| manganese ore | 0.8 |
| iron powder | 59.2 |

When welding the members in the downhand and vertical position, the electrode features extremely good welding and technological characteristics, in which case the mechanical properties of the weld joint metal and of the joint itself are at a high level as shown in the table below.

| Type of welding | Position of welding | Welding current, a. | Welding voltage, v. | Instantaneous strength, kg./mm.$^2$ | Specific elongation, percent | Impact strength in kg.m/cm.$^2$ at— | | |
|---|---|---|---|---|---|---|---|---|
| | | | | | | +20° C. | −40° C. | −60° C. |
| Free formation | Downhand | 350–400 | 28–32 | 51.5–52.3 | 29.4–30.5 | 20.5–23.5 | | 10.2–11.5 |
| Forced formation | Vertical | 350–400 | 28–30 | 53.2–54.5 | 29.5–31.2 | 15.2–18.5 | 10.5–12.5 | |

EXAMPLE 3

A flux-cored electrode having a diameter of 3.0 mm in which the steel sheath comprises 70 percent of the total weight of the electrode and the core contains (wt.%):

| | |
|---|---|
| fluorite concentrate | 26 |
| marble | 10 |
| ferromanganese | 6.5 |
| ferrosilicon | 3.5 |
| alumina | 6.0 |
| manganese ore | 1.5 |
| iron powder | 46.5 |

The electrode provides for high efficiency and stability of the building-up process, good technological properties and high mechanical characteristics of the weld joint. The results of the tests are given in the table below.

| Type of welding | Position of welding | Welding current, a. | Welding voltage, v. | Instantaneous strength, kg./mm.² | Specific elongation, percent | Impact strength in kg.m/cm.² at— | | |
|---|---|---|---|---|---|---|---|---|
| | | | | | | +20° C. | −40° C. | −60° C. |
| Free formation | Downhand | 350-400 | 28-32 | 52.5-54.2 | 27.0-29.2 | 18.2-22.0 | | 10.5-11.7 |
| Forced formation | Vertical | 350-400 | 28-30 | 53.5-54.5 | 25.4-28.3 | 14.3-16.2 | 8.4-9.2 | |

The above examples well characterize the advantages of the electrode of the invention.

The claimed electrode is designed for welding by means of reverse-polarity direct current in a shielding gas atmosphere (substantially in carbon dioxide gas). The electrode provides for extremely good formation of vertical, inclined and horizontal joints made by means of forced formation as well as good formation of joints made by means of free formation. The weld joints made with the help of this electrode offer a high resistance to hot cracks, have a low content of gases, and feature high mechanical characteristics.

What we claim is:

1. A continuous electrode for shielded-gas welding and built-up welding of steel consisting of a steel sheath with a powder core comprising in percent of the core weight:

| | |
|---|---|
| fluorite concentrate | 15-26 |
| marble | 5.0-10 |
| alumina | 2.0-6.0 |
| manganese ore | 0.5-1.5 |
| ferromanganese | 4.5-6.5 |
| ferrosilicon | 1.0-3.5 | the balance being iron powder.

2. A continuous electrode as claimed in claim 1 wherein the core constitutes 30 percent by weight of the electrode.

* * * * *